(12) United States Patent
Ge et al.

(10) Patent No.: US 11,112,951 B2
(45) Date of Patent: Sep. 7, 2021

(54) METHOD, DEVICE AND STORAGE MEDIUM FOR DISPLAYING CONTENT IN NOTIFICATION BAR

(71) Applicant: Beijing Xiaomi Mobile Software Co., Ltd., Beijing (CN)

(72) Inventors: Huiting Ge, Beijing (CN); Xushu Liu, Beijing (CN); Yaoyun Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/824,080

(22) Filed: Mar. 19, 2020

(65) Prior Publication Data

US 2021/0089178 A1    Mar. 25, 2021

(30) Foreign Application Priority Data

Sep. 20, 2019  (CN) .......................... 201910892832.1

(51) Int. Cl.
*G06F 3/0484* (2013.01)
*H04L 29/08* (2006.01)

(52) U.S. Cl.
CPC ............ *G06F 3/0484* (2013.01); *H04L 67/32* (2013.01)

(58) Field of Classification Search
CPC ............................... G06F 3/0484; H04L 67/32
USPC ......................................................... 715/772
See application file for complete search history.

(56) References Cited

U.S. PATENT DOCUMENTS

| | | | |
|---|---|---|---|
| 8,793,575 B1 | 7/2014 | Lattyak et al. | |
| 10,733,260 B1* | 8/2020 | Sahl .................... | G06F 9/44536 |
| 2011/0113363 A1* | 5/2011 | Hunt ................... | G06F 3/04847 |
| | | | 715/800 |
| 2012/0060110 A1* | 3/2012 | Virmani .................. | G06F 9/451 |
| | | | 715/771 |
| 2014/0181659 A1* | 6/2014 | Kumar ............... | H04N 21/4725 |
| | | | 715/716 |
| 2014/0283142 A1* | 9/2014 | Shepherd .............. | H04M 1/673 |
| | | | 726/30 |
| 2017/0185421 A1* | 6/2017 | Ketola .................. | G06F 3/1462 |
| 2017/0285896 A1* | 10/2017 | Chandra ............... | G06F 3/1454 |
| 2017/0322782 A1* | 11/2017 | Pakiman .................. | G06F 8/34 |
| 2019/0087070 A1* | 3/2019 | Pan ......................... | H04L 51/24 |

(Continued)

FOREIGN PATENT DOCUMENTS

| | | |
|---|---|---|
| CN | 103995771 A | 8/2014 |
| EP | 2 383 959 A1 | 11/2011 |
| EP | 2 975 511 A1 | 1/2016 |

OTHER PUBLICATIONS

Extended European Search Report in European Application No. 20177024.5, dated Nov. 17, 2020.

*Primary Examiner* — William D Titcomb
(74) *Attorney, Agent, or Firm* — Finnegan, Henderson, Farabow, Garrett & Dunner, L.L.P.

(57) ABSTRACT

A method for displaying content in a notification bar, includes: receiving a display instruction corresponding to a notification bar interface; displaying the notification bar interface according to the display instruction; displaying a first notification entry in the notification bar interface, the first notification entry including related information of media content recently browsed in a first application, and the related information including at least one of identification information or a browsing progress.

17 Claims, 10 Drawing Sheets

(56) References Cited

U.S. PATENT DOCUMENTS

2019/0258371 A1\* 8/2019 Huang .................... G06F 16/00
2020/0028753 A1\* 1/2020 Powar .................... G06Q 20/32

\* cited by examiner

METHOD, DEVICE AND STORAGE MEDIUM FOR DISPLAYING CONTENT IN NOTIFICATION BAR

CROSS-REFERENCE TO RELATED APPLICATION

This application is based upon and claims priority to Chinese Patent Application No. 201910892832.1, filed on Sep. 20, 2019, the entire content of which is incorporated herein by reference.

TECHNICAL FIELD

Embodiments of the present disclosure relate to the technical field of terminals, and in particular, to a method, device and storage medium for displaying content in a notification bar.

BACKGROUND

A notification bar of a mobile terminal is used to display notification information of some applications to a user, such as messages, missed calls, application push notifications, and so on.

At present, most of notification entries about the application-push notifications displayed in the notification bar include the application's logo and a push phrase provided by the application, such as "To find free novels, Come to Quan Min Sou Shu". This type of notification entries may contain a limited amount of information and present the information in a single form.

SUMMARY

Embodiments of the present disclosure provide a content display method, device, and storage medium in a notification bar.

According to a first aspect of the present disclosure, a content display method in a notification bar, includes: receiving a display instruction corresponding to a notification bar interface; displaying the notification bar interface according to the display instruction; and displaying a first notification entry in the notification bar interface, the first notification entry including related information of media content recently browsed in a first application, and the related information including at least one of identification information or a browsing progress.

According to a second aspect of the present disclosure, a device for displaying content in a notification bar, includes: a processor; and a memory for storing instructions executable by the processor, wherein the processor is configured to: receive a display instruction corresponding to a notification bar interface; display the notification bar interface according to the display instruction; and display a first notification entry in the notification bar interface, the first notification entry including related information of media content recently browsed in a first application, and the related information including at least one of identification information or a browsing progress.

According to a third aspect of the present disclosure, a non-transitory computer-readable storage medium has stored thereon instructions that, when executed by a processor of a mobile terminal, cause the mobile terminal to perform a method for displaying content in a notification bar, the method including: receiving a display instruction corresponding to a notification bar interface; displaying the notification bar interface according to the display instruction; and displaying a first notification entry in the notification bar interface, the first notification entry including related information of media content recently browsed in a first application, and the related information including at least one of identification information or a browsing progress.

The beneficial effects brought by the technical solutions provided by the embodiments of the present disclosure at least include the following.

By displaying the first notification entry in the notification bar interface, the first notification entry including the related information of the media content recently browsed in the first application, such as the identification information and/or the browsing progress, which achieves that the related information of the media content is displayed to the user in the notification bar interface, so that the user can quickly learn about the browsing progress of the recently browsed media content, and the amount of information and display content in the notification bar interface is enriched, thereby providing the user with rich and useful information in the notification bar interface.

It should be understood that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure.

DETAILED DESCRIPTION

Exemplary embodiments will be described in detail herein, examples of which are illustrated in the accompanying drawings. When the following description refers to the drawings, the same numeral in different figures denotes the same or similar element, unless otherwise indicated. The exemplary embodiments described below do not represent all embodiments consistent with the present disclosure. Instead, they are merely examples of devices and methods consistent with aspects of the present disclosure as recited in the appended claims.

Methods provided by embodiments of the present disclosure may be performed by a mobile terminal, for example portable electronic equipment, such as a mobile phone, a tablet computer, a game console, an e-book reader, a multimedia player, and a wearable device. In some embodiments, a variety of applications are installed in the mobile terminal, such as a media application, a shopping application, a music application, an information application, and so on.

Figure 1:
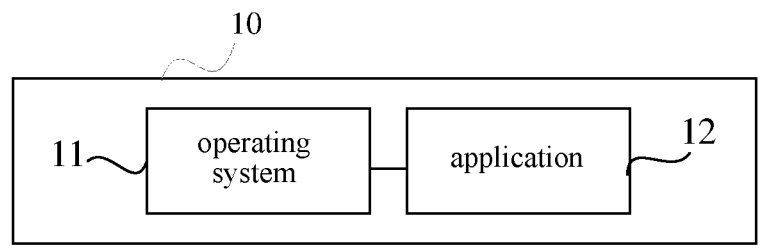
FIG. 1 is a schematic diagram showing a mobile terminal according to an exemplary embodiment.

FIG. 1 is a schematic diagram showing a mobile terminal 10 according to an exemplary embodiment. As shown in FIG. 1, an operating system 11 can be installed and run in the mobile terminal 10. The operating system 11 is a computer program for managing hardware and software resources of the mobile terminal 10. In the embodiment, the type of the operating system is not limited, and may be an Android operating system, an iOS operating system, a Windows operating system, or other customized operating systems based on the Android operating system, or a self-developed operating system.

In addition, various applications 12 can also be installed and run in the mobile terminal 10. In some embodiments, the applications 12 include a media application. The media application may be an application for providing media content to a user. For example, the media application may be a video application, a novel application, or the like, to provide the media content such as the video and the novel to the user.

The operating system 11 and the application 12 can communicate with each other. For example, the operating system 11 can acquire related information from the application 12 and then display a notification entry in a notification bar based on the information.

The methods described below may be performed by a mobile terminal, such as the mobile terminal 10. In some embodiments, each step of a method may be performed by an operating system of the mobile terminal.

Figure 2:
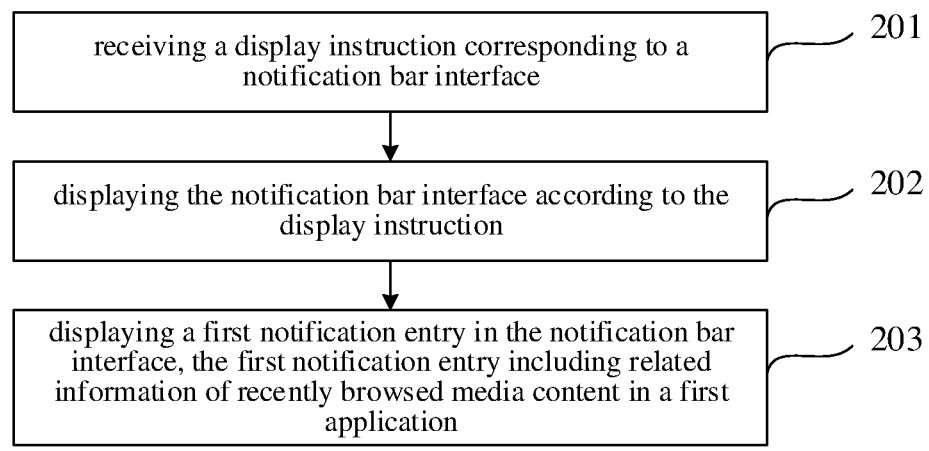
FIG. 2 is a flow chart showing a method for displaying content in a notification bar according to an exemplary embodiment.

FIG. 2 is a flow chart showing a method for displaying content in a notification bar according to an exemplary embodiment. The method may include the following steps.

In step 201, a display instruction corresponding to a notification bar interface is received.

The display instruction corresponding to the notification bar interface may be an operation instruction for triggering display of the notification bar interface. The display instruction may be triggered by a user. In an embodiment, the user triggers generation of the display instruction of the notification bar interface by performing a sliding operation on a screen of the mobile terminal. The sliding operation may be sliding up, sliding down, sliding left, or sliding right, etc., which is not limited in the embodiment. Taking the sliding down to trigger the generation of the display instruction as an example, the user's finger slides down a certain distance from the top of the mobile terminal to trigger the generation of the display instruction corresponding to the notification bar interface. In another embodiment, the user triggers the generation of the display instruction corresponding to the notification bar interface through a form of voice, gesture, or the like.

In step 202, the notification bar interface is displayed according to the display instruction.

The notification bar interface is a user interface for displaying system information and notification entries. The system information may include, but is not limited to, at least one of: time, date, and commonly used icons. In an embodiment, the commonly used icon is a shortcut for the user to enter different applications. For example, by the user clicking different commonly used icons on the notification bar interface of the mobile terminal, the mobile terminal is further caused to open different applications corresponding to the different commonly used icons. In an embodiment, the commonly used icon is a shortcut for the user to trigger different functions of the mobile terminal. For example, by the user clicking different commonly used icons on the notification bar interface of the mobile terminal, the mobile terminal is further controlled to perform different functions corresponding to the different commonly used icons, such as screenshots, screen recording or rotating screen. In an embodiment, the user sets one or more commonly used icons to be displayed on the notification bar interface according to personal habits, and display positions of the commonly used icons are adjustable. For example, the positions of the commonly used icon A and the commonly used icon B may be exchanged.

In an embodiment, the notification entry is push information of an application displayed by the mobile terminal to the user. For example, the mobile terminal pushes the latest message of the application to the user in real time to show the real-time changes of the application. It should be noted that, in some embodiments, if the application in the mobile terminal does not generate a new message, the notification entry may not be displayed on the notification bar of the mobile terminal.

In step 203, a first notification entry is displayed in the notification bar interface, the first notification entry including related information of recently browsed media content in a first application.

The first application may be any application having a function of providing the media content in the mobile terminal, and the first application may be referred to as the media application. In the embodiment, the media content may be visual content for viewing or browsing by the user. The media content may be Internet content, and the media content may be a novel, a video, or the like.

In an embodiment, when the first application is in a running state, if the mobile terminal receives the display instruction corresponding to the notification bar interface, the first notification entry is displayed in the notification bar interface. In an embodiment, the running state includes a foreground running state and a background running state. The foreground running state may be a state in which the user interface of the first application is displayed on the screen of the mobile terminal, and the background running state may be a state in which the user interface of the first application is not displayed on the screen of the mobile terminal. The user can control the application to switch between the foreground running state and the background running state through operations. In the embodiment, when the mobile terminal receives the display instruction corresponding to the notification bar interface, whether the first application is in the foreground running state or the background running state, the mobile terminal can display the first notification entry related to the first application in the notification bar interface.

In the embodiment, the most recently browsed media content may be the media content that the user browsed within a certain time range closest to a current time in the first application. The first notification entry may display related information of one or more pieces of the media content recently browsed in the first application.

In the embodiment, the related information of the media content includes identification information and/or browsing progress. The identification information has a one-to-one correspondence relationship with the media content, that is, the unique corresponding media content can be determined based on the identification information.

In some embodiments, the identification information includes a cover picture. Before the step 203, the method may further include the following steps.

In a first step, configuration information of a user interface of the first application is acquired.

The configuration information includes content to be displayed in the user interface of the first application. The user interface may be an interface in the first application that is used to display the related information of the above media content. In an embodiment, the user interface includes the cover picture of the media content, such as a bookshelf interface in the novel application. In addition, the user interface may further include: a name of the media content and/or a creator of the media content, and the like, which are not limited in the embodiment.

In a second step, the cover picture of the recently browsed media content is extracted from the configuration information.

In an embodiment, the operating system of the mobile terminal acquires the configuration information of the user interface for displaying the recently browsed media content from the first application, and then further acquires the cover picture of the recently browsed media content from the configuration information.

In addition to the recently browsed media content, the cover picture of other media content can also be acquired according to the above method. It should be noted that if the size of the cover picture acquired through the above method does not support placing the cover picture in the notification bar, the cover picture may be scaled according to a certain ratio. The scaling of the cover picture may be set by the operating system according to the actual situation, and it may be 50%, 60%, 70%, or the like.

In an embodiment, the identification information further includes a name of the media content, and the name of the media content may also be acquired by the operating system from the above configuration information.

In an embodiment, the browsing progress may be a position of the media content currently browsed by the user. For example, in the novel application, when the user browses to the tenth chapter, the browsing progress may be displayed as the chapter name of the tenth chapter. In another embodiment, the browsing progress may be a browsing ratio of the media content by the user, and the browsing ratio is a ratio of the amount of the media content having been browsed by the user to the total amount of the media content. Taking the novel application as an example, the media content in the application is a novel. For a certain novel, the identification information of the novel can include the name and cover picture of the novel. The browsing progress of the novel may be the browsing ratio of the novel by the user. For example, as for a novel with a total of one hundred chapters, when the user finishes browsing the tenth chapter, the browsing progress at this time may be 10%.

In an embodiment, the recently browsed media content may be the media content that the user is currently browsing.

Figure 3:
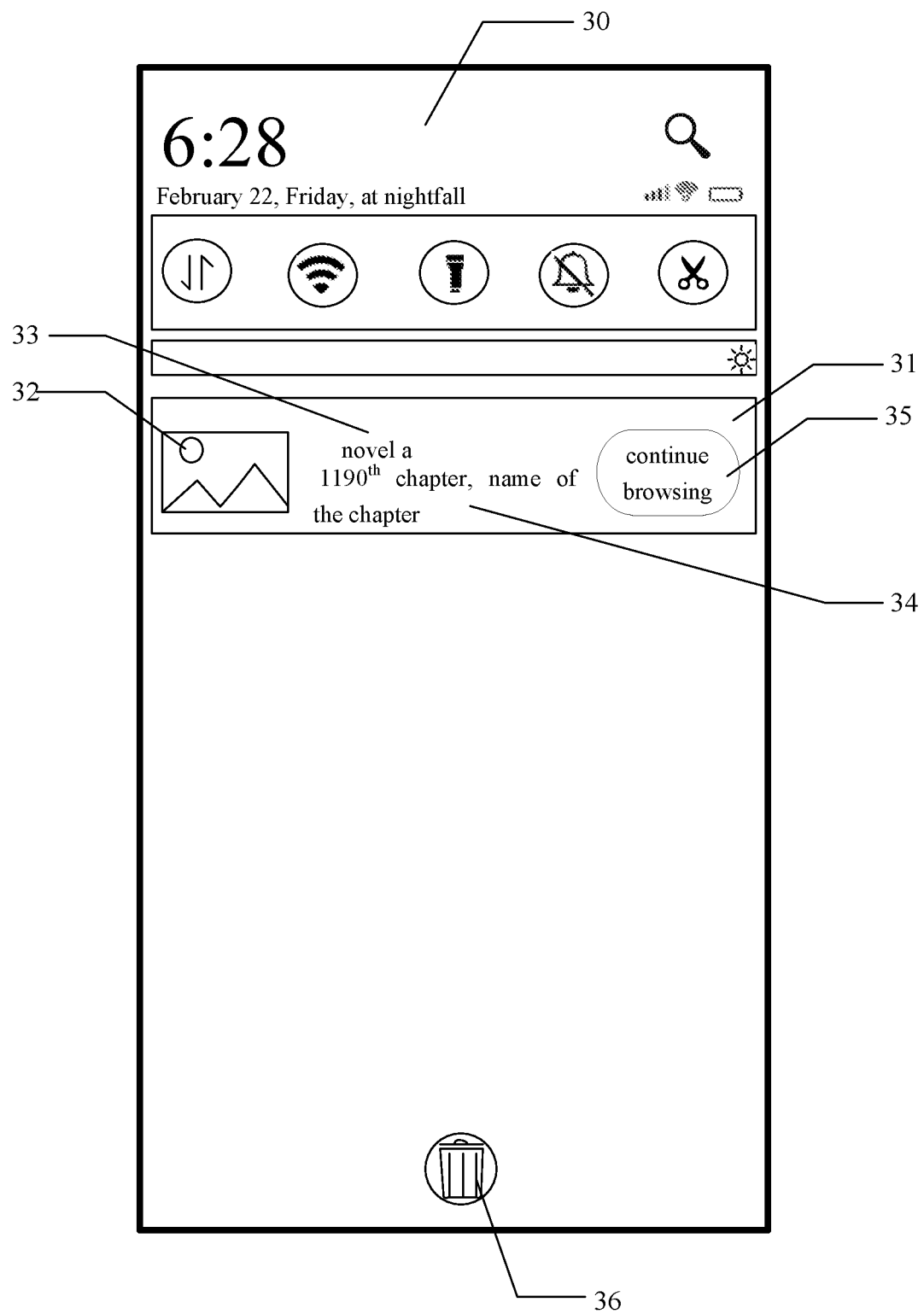
FIG. 3 shows a schematic diagram of a notification bar interface according to an exemplary embodiment.

FIG. 3 shows a schematic diagram of a notification bar interface 30 according to an exemplary embodiment. With reference to FIG. 3, taking the novel application as an example, when the novel application is in a running state, the user causes the mobile terminal to display the notification bar interface 30 through a sliding down operation. The notification bar interface 30 may include a first notification entry 31, and a cover picture 32, a name 33, a browsing progress 34, and a "continue browsing" button 35 of the novel a that the user is currently browsing are displayed in the first notification entry 31.

A display position of the first notification entry in the notification bar interface may be set by the operating system. In an embodiment, the first notification entry and other notification entries of the notification bar interface are arranged in the notification bar interface according to the appearance time sequence. In another embodiment, in order to facilitate the user to browse the recently browsed media content, the first notification entry is arranged at the top of the above notification bar interface, and other notification entries are arranged below the first notification entry according to the appearance time sequence.

In an embodiment, the first notification entry 31 further includes a first operation control. For example, the first operation control may be the "continue browsing" button 35.

After the step 203 (FIG. 2), the following steps may be further included.

In a first step, a trigger signal corresponding to the first operation control is received.

In an embodiment, the user clicks the first operation control to generate the trigger signal. The first operation control is an operation control for triggering the display of the detailed interface of the recently browsed media content.

In a second step, according to the trigger signal, the first application is invoked to display a detailed interface of the recently browsed media content.

The detailed interface of the media content is a user interface for displaying detailed information of the media content in the first application. In the embodiment, after receiving the trigger signal corresponding to the first operation control, the mobile terminal invokes the first application, and triggers the first application to display a detailed interface of the recently browsed media content, thereby realizing to open the detailed interface of media content from the notification bar interface through the shortcut.

It should be noted that the above step 203 may be performed after the step 202, or may be performed at the same time as step 202. That is, when the notification bar interface is displayed, the notification entry is displayed synchronously, which is not limited in the embodiment.

It should also be noted that the operating system of the mobile terminal may acquire the related information of the recently browsed media content from the first application. Taking the Android system as an example, the first application records the related information of the recently browsed media content by the user, and then sends the related information to the operating system of the mobile terminal, so that the operating system can display the notification entries related to the first application in the notification bar interface, such as the first notification entry described above. In the Android system, the above processes can be implemented through Remote Views.

In the embodiments of the present disclosure, by displaying the first notification entry in the notification bar interface, the first notification entry including the related information of the recently browsed media content in the first application, such as the identification information and/or the browsing progress, which achieves displaying the related information of the media content to the user in the notification bar interface, so that the user can quickly learn about the browsing progress of the recently browsed media content, and the amount of information and display content in the notification bar interface is enriched, thereby providing the user with richer, more useful information in the notification bar interface.

In addition, by directly displaying the first operation control in the first notification entry, the user is guided to click the first notification entry, which facilitates the user to trigger a browsing instruction of the corresponding media content, thereby quickly browsing the corresponding media content.

Figure 4:
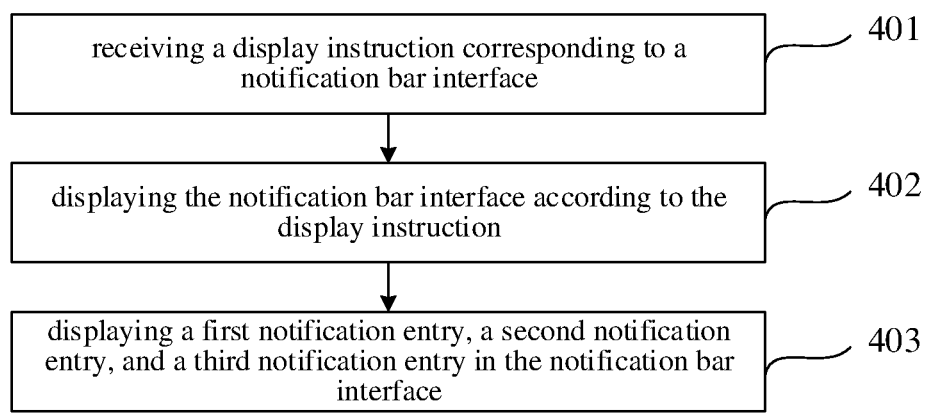
FIG. 4 is a flow chart showing a method for displaying content in a notification bar according to an exemplary embodiment.

FIG. 4 is a flow chart showing a method for displaying content in a notification bar according to an exemplary embodiment. The method can include the following steps.

In step 401, a display instruction corresponding to a notification bar interface is received.

In step 402, the notification bar interface is displayed according to the display instruction.

Steps 401 and 402 are the same as steps 201 and 202 (FIG. 2).

In step 403, a first notification entry, a second notification entry, and a third notification entry are displayed in the notification bar interface.

The display of the first notification entry in the notification bar interface has been described in detail above.

In an embodiment, the second notification entry is displayed in the notification bar interface, and the second notification entry includes related information of updated media content in the first application. The updated media content may be the media content which generates new content in the application. The related information includes identification information and update conditions corresponding to the updated media content. In an embodiment, the update conditions include at least one of the following: the amount of updated media content, updating modules and the number thereof corresponding to the updated media content. For example, when the media content is a novel, the number of updated novels and the total number of updated chapters in the updated novel are displayed in the second notification entry.

In an embodiment, similar to the above first notification entry, the second notification entry further includes a second operation control, which is an operation control for triggering the first application to display the updated media content, such as a button.

In the embodiment, when the updated media content includes at least two pieces of updated media content, according to an information switching instruction corresponding to the second notification entry, related information of first media content displayed in the second notification entry is switched to related information of second media content to be displayed in the second notification entry. In the embodiment, the first media content and the second media content are two pieces of different updated media content. In an embodiment, the user triggers the generation of the switching instruction by performing sliding up, sliding down, sliding left, or sliding right in the second notification entry; or, the user triggers the generation of the switching instruction by voice, gesture, or the like.

Figure 5:
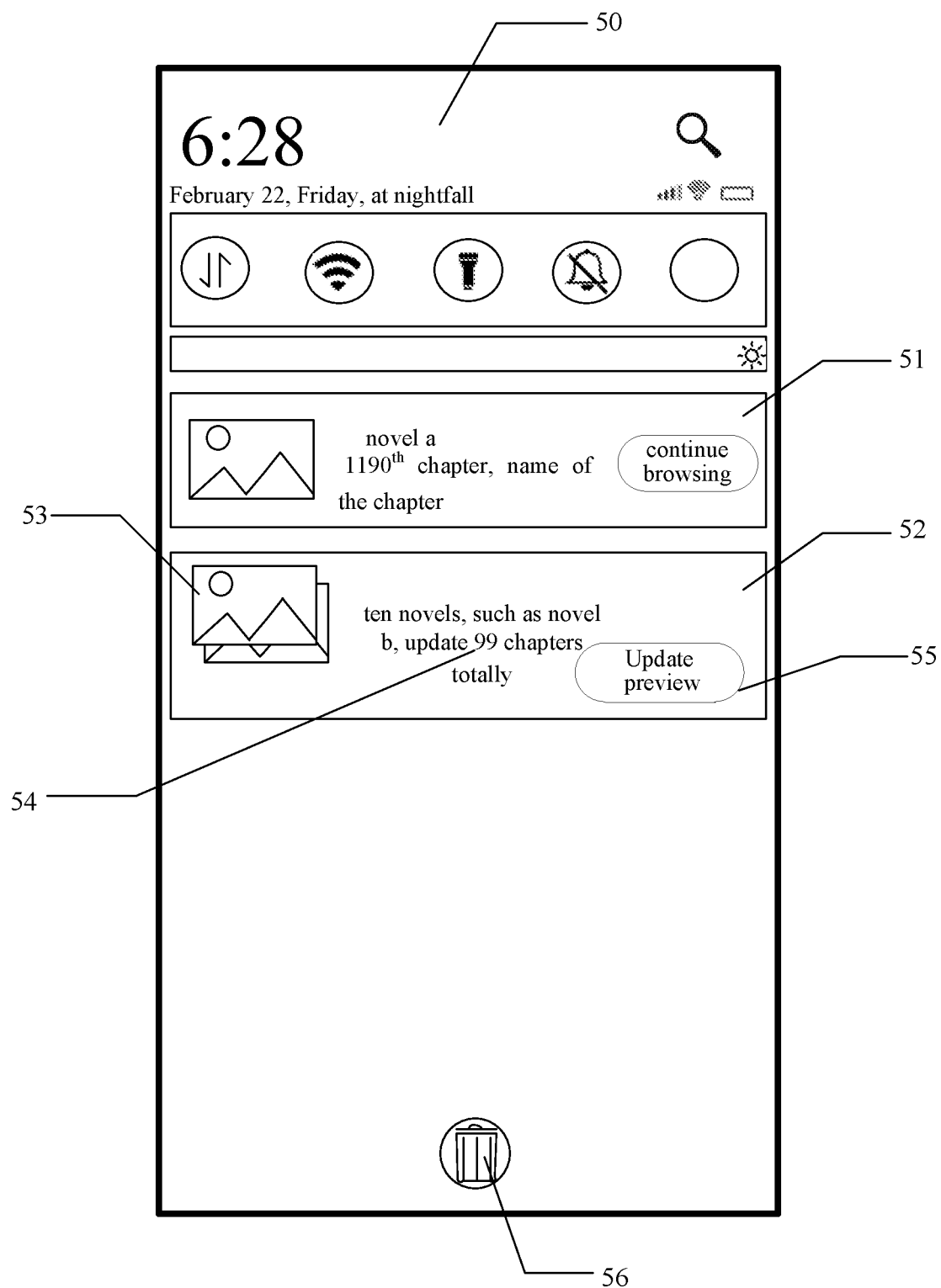
FIG. 5 shows a schematic diagram of a notification bar interface according to an exemplary embodiment.

In some embodiments, the second notification entry displays related information of the multiple pieces of the updated media content in the first application, and combines the related information of the multiple pieces of the updated media content for display. FIG. 5 shows a schematic diagram of a notification bar interface 50 according to an exemplary embodiment. Referring to FIG. 5, taking the novel application as an example, when the novel application is in the running state, the user triggers the display of the notification bar interface 50 through a sliding down operation. The notification bar interface 50 includes a first notification entry 51 and a second notification entry 52. The first notification entry 51 displays the cover, the browsing progress, and the "continue browsing" button of the novel a that the user is currently browsing, and the second notification entry 52 displays a cover 53, an updated condition 54 and an "update preview" button 55 of the partially updated novel.

Figure 6:
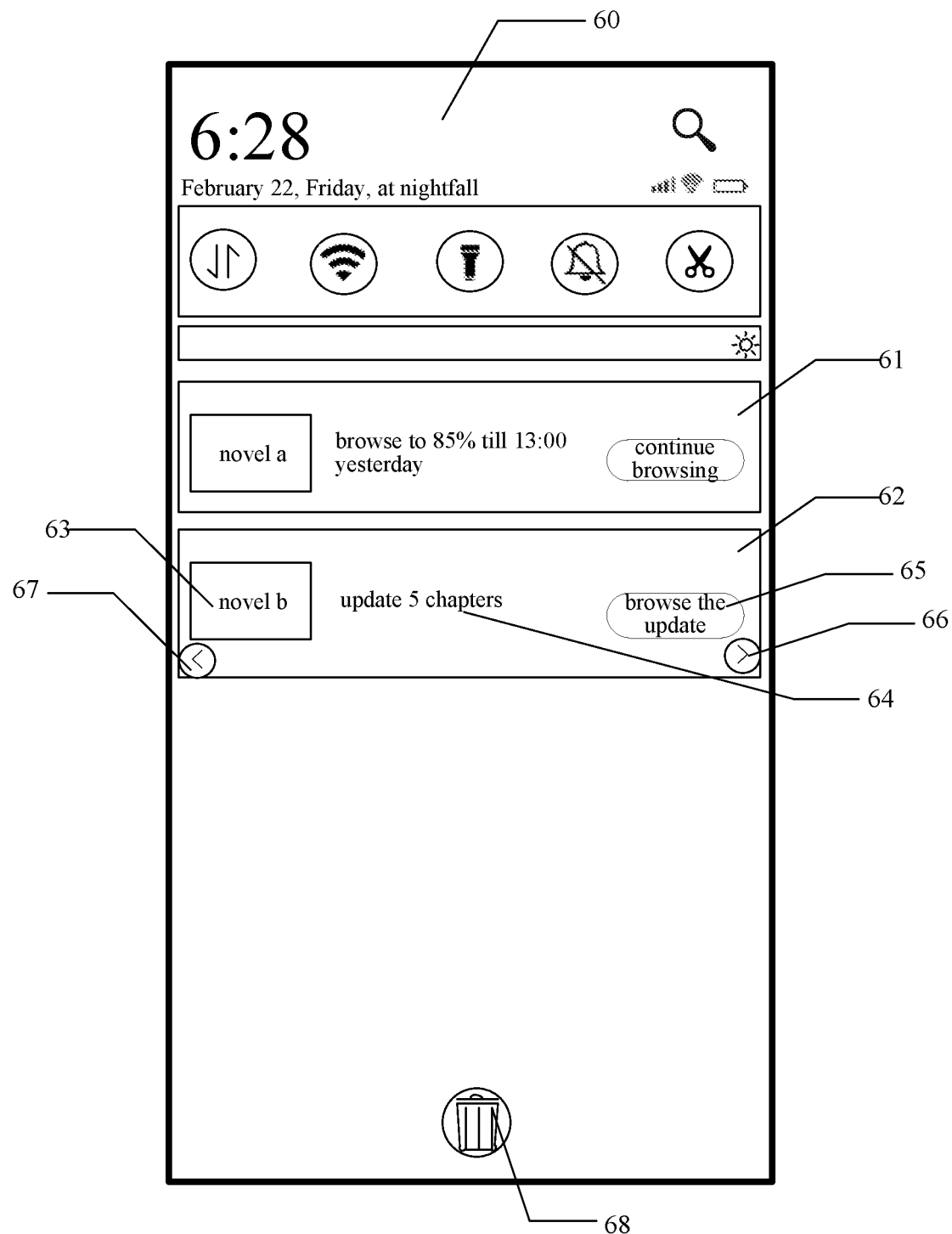
FIG. 6 shows a schematic diagram of a notification bar interface according to an exemplary embodiment.

In some embodiments, the second notification entry displays related information of the multiple pieces of the updated media content in the first application, and the related information of the multiple pieces of the updated media content is switched by a switching button. FIG. 6 shows a schematic diagram of a notification bar interface 60 according to an exemplary embodiment. Referring to FIG. 6, taking the novel application as an example, when the novel application is in the running state, the user displays the notification bar interface 60 through a sliding down operation. The notification bar interface 60 includes a first notification entry 61 and a second notification entry 62. The first notification entry 61 displays the cover, the browsing progress, and the "continue browsing" button of the novel a that the user is currently browsing, and the second notification entry 62 displays a cover 63, an updated condition 64 and an "update preview" button 65 of the novel b. The user controls the second notification entry 62 to switch to the right through a first switching button 66, and then the cover, the updated condition and the "update browsing" button of the novel c are displayed; or the user controls the second notification entry 62 to switch to the left through a second switching button 67 and then the cover, the updated condition and the "update browsing" button of the novel d are displayed.

In an embodiment, when it is detected that the first application exits from running, the notification entry related to the first application is cleared in the notification bar interface. That is, when the first application exits from running, the first notification entry and the second notification entry related to the first application in the notification bar interface are automatically cleared.

Similar to the second notification entry, the first notification entry may display the related information of the multiple pieces of the recently browsed media content. In an embodiment, the mobile terminal acquires the recently browsed media content according to the time range. The time range may be one day, two days, or three days, etc., which is not limited in the embodiment. For example, the mobile terminal selects the media content browsed by the user within three days as the most recently browsed media content. In another embodiment, the mobile terminal acquires the recently browsed media content according to the quantity range. The quantity range may be one, two, or three, etc., which is not limited in the embodiment. For example, the mobile terminal selects three pieces of the media content recently browsed by the user as the recently browsed media content.

Figure 7:
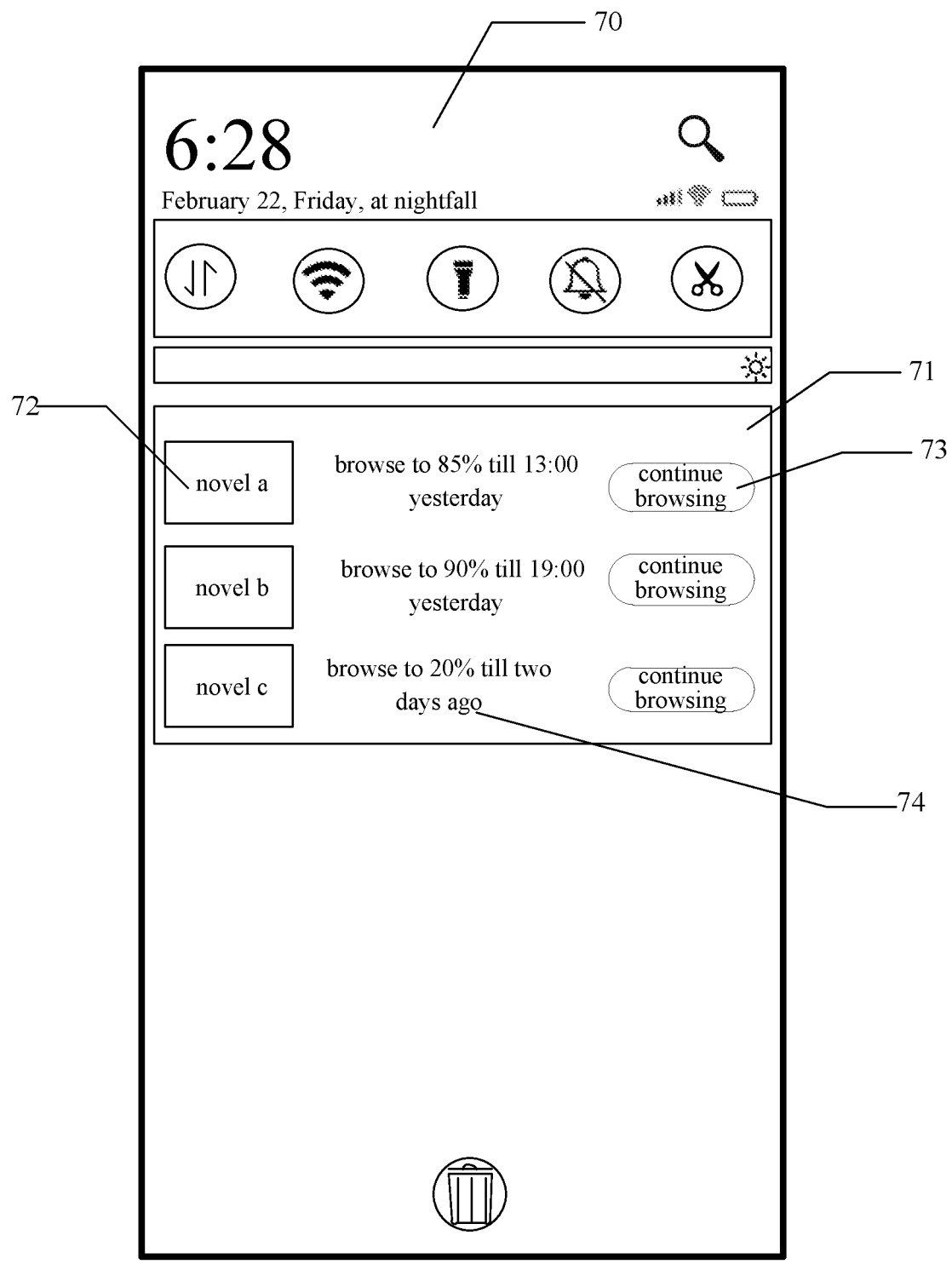
FIG. 7 shows a schematic diagram of a notification bar interface according to an exemplary embodiment.

In an embodiment, the foregoing first notification entry displays the related information of the multiple pieces of the recently browsed media content in the first application, and the related information of the multiple pieces of the media content is displayed in a list form. In an embodiment, the related information of the multiple pieces of the media content is displayed in a descending or an ascending order of the recent browsing time. FIG. 7 shows a schematic diagram of a notification bar interface 70 according to an exemplary embodiment. Referring to FIG. 7, taking the novel application as an example, when the novel application is in the running state, the user displays the notification bar interface 70 through a sliding down operation. The notification bar interface 70 includes a first notification entry 71. In the first notification entry 71, a cover 72, a browsing progress 73, and a "continue browsing" button 74 of the novel a, the novel b, and the novel c are displayed in a descending order of the recent browsing time, respectively, and the novel cover includes the name of the novel.

Figure 8:
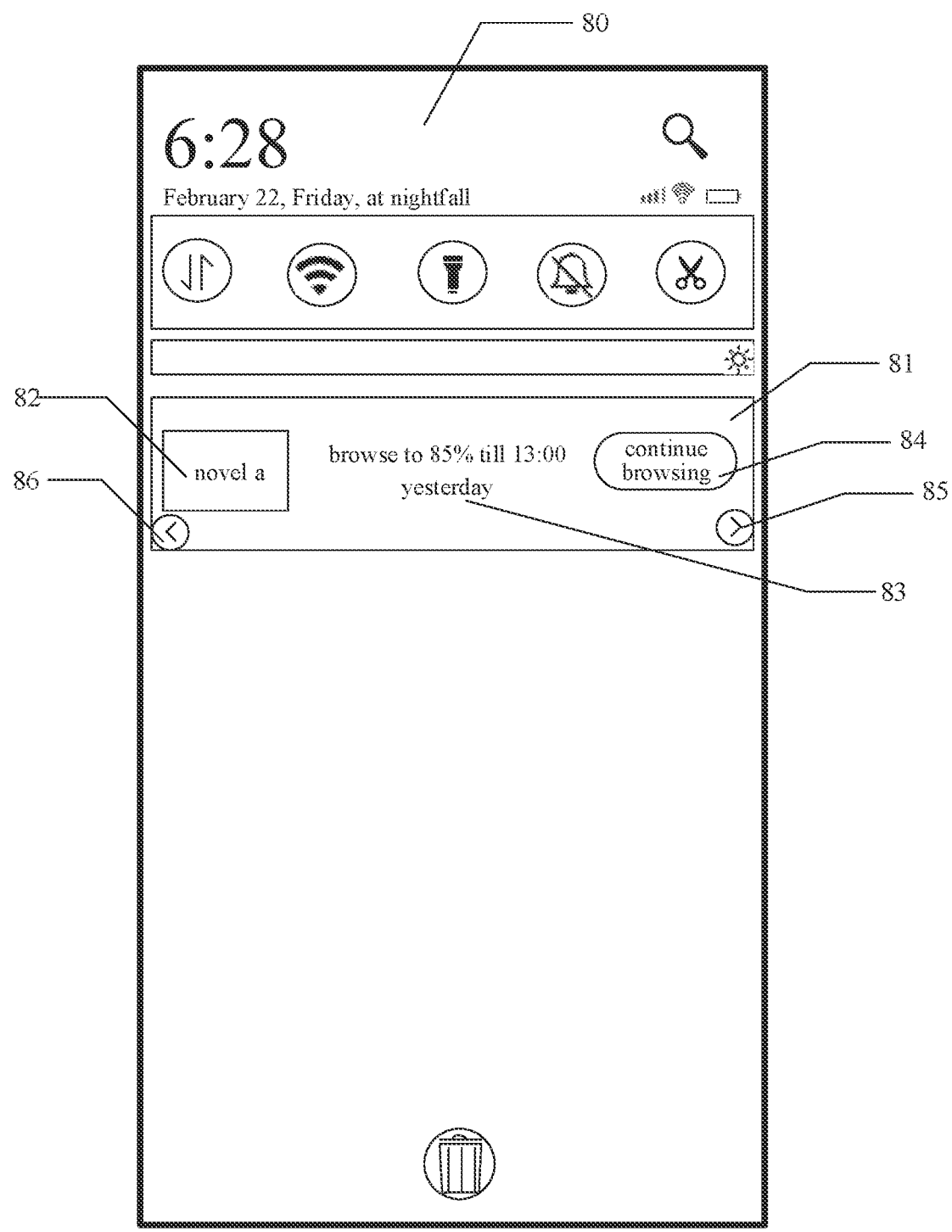
FIG. 8 shows a schematic diagram of a notification bar interface according to an exemplary embodiment.

In an embodiment, the first notification entry displays the related information of the multiple pieces of the recently browsed media content in the first application, and combines the related information of the multiple pieces of media content for display. In an embodiment, the related information of the multiple pieces of media content is switched through a switch button. FIG. 8 shows a schematic diagram of a notification bar interface 80 according to an exemplary embodiment. Referring to FIG. 8, taking the novel application as an example, when the novel application is in the running state, the user displays the notification bar interface 80 through a sliding down operation. The notification bar interface 80 includes a first notification entry 81. The first notification entry 81 displays a cover 82, a browsing progress 83, and a "continue browsing" button 84 of the novel a. The user controls the first notification entry 81 to switch to the right through a first switching button 85, and then the cover, the browsing progress, and the "continue browsing" button of the novel b are displayed; or the user controls the first notification entry 81 to switch to the left through a second switching button 86, and then the cover, the browsing progress, and the "continue browsing" button of the novel c are displayed. The novel cover includes the name of the novel.

In an embodiment, the third notification entry is displayed in the notification bar interface, and the third notification entry includes recommendation information associated with recently browsed media content in a second application. The second application is another application different from the first application. The second application may be a media application, a music application, a shopping application, or an information application, and the like, which is not limited in the embodiment. It should be noted that the embodiment of the present disclosure does not limit the type of the above-mentioned associated recommendation information. In an embodiment, the mobile terminal acquires the associated recommendation information through keyword matching. For example, if the keyword of the novel recently browsed by the user is a pet cat, the mobile terminal acquires the purchase link or news information with the keyword the same as the pet cat. In an embodiment, the recommendation information of the third notification entry is displayed in a text form.

Figure 9:
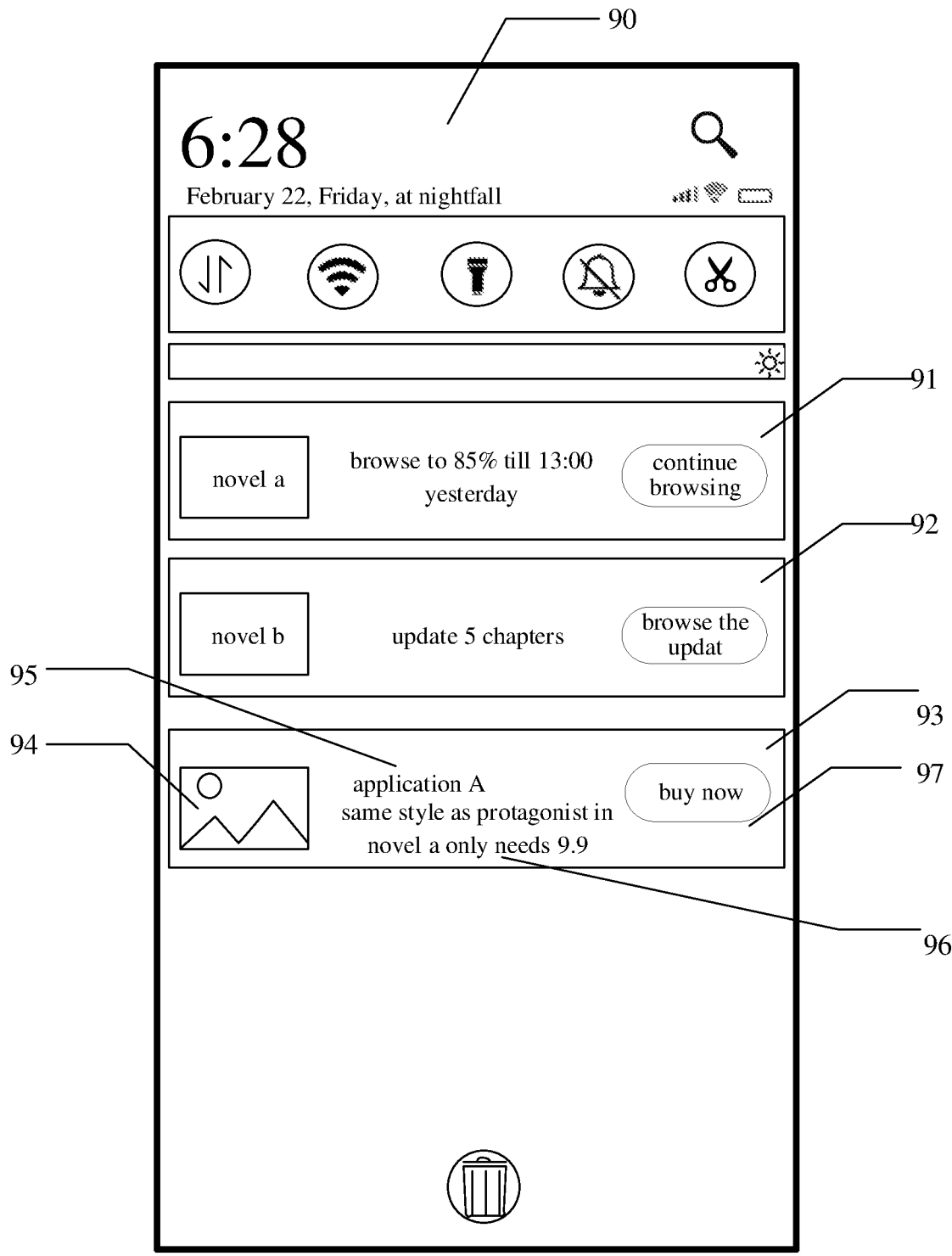
FIG. 9 shows a schematic diagram of a notification bar interface according to an exemplary embodiment.

In an embodiment, the mobile terminal selects recommendation information associated with the recently browsed media content in different applications, and displays the recommendation information in the notification bar interface. FIG. 9 shows a schematic diagram of a notification bar interface 90 according to an exemplary embodiment. Referring to FIG. 9, taking the first application being the novel application as an example, when the novel application is in the running state, the user displays the notification bar interface 90 through a sliding down operation. The notification bar interface 90 includes a first notification entry 91, a second notification entry 92, and a third notification entry 93. The first notification entry 91 displays the cover, the browsing progress, and the "continue browsing" button of the novel a; the second notification entry 92 displays the cover, the browsing progress, and the "continue browsing" button of the novel b; the third notification entry 93 displays a logo 94, a name 95 of the application A and recommendation information 96, and a "buy now" button 97 related to the novel a.

It should be noted that the first notification entry, the second notification entry, or the third notification entry can be displayed in the notification bar interface at the same time, or different notification entries can be displayed in the notification bar interface in combination with actual conditions, which is not limited in the embodiment of the present disclosure.

In the embodiments of the present disclosure, by displaying related information of the updated media content in the first application in the second notification entry, the updated content is intuitively displayed to the user, which is beneficial for the user to timely view the updated content.

In addition, by displaying the recommendation information associated with recently browsed media content in the third notification entry, the related recommendation information that the user may be interested in can be displayed while the user's current interest can be grasped in real time, thereby improving the practicality of content display of the notification bar interface.

In an exemplary embodiment, the first notification entry is in a default locked state, that is, when the first application is kept in the running state, the related information displayed in the first notification entry cannot be cleared. In this case, after the above step 203, the following steps are further included.

In a first step, a clear instruction corresponding to the notification bar interface is received.

The clear instruction may be an operation instruction for triggering the notification bar interface to clear the notification entry. In an embodiment, the user can slide left or right on each notification entry to clear the notification entries one by one. In another embodiment, the user clears multiple notification entries in the notification bar interface by clicking a one-button clear button, such as a button 36 (FIG. 3) or a button 56 (FIG. 5).

In a second step, according to the clear instruction, notification entries in an unlocked state in the notification bar interface are cleared and the notification entries in the locked state are retained.

In the embodiment, when the first application is in a running state, the notification entries related to the first application (such as the first notification entry and the second notification entry described above) are in a locked state, other notification entries are in a non-locked state. The other notification entries may be notification entries related to applications other than the first application. When the mobile terminal receives the clear instruction corresponding to the notification bar interface, other notification entries in the notification bar interface are cleared.

In another embodiment, the first notification entry is not locked by default. That is, when the first application is in the running state, the notification entries related to the first application may be cleared. In this case, after the above step 203, the following steps are further included.

In a first step, a lock instruction corresponding to the first notification entry is received.

The lock instruction may be an operation instruction for triggering a notification entry to be locked. In an embodiment, the user may trigger the generation of the lock instruction by performing a long-press operation on the first notification entry. In another embodiment, the user triggers the generation of the lock instruction by voice, gesture, or the like.

In a second step, according to the lock instruction, the first notification entry is controlled to switch from the unlocked state to the locked state.

In the embodiment, after the mobile terminal receives the lock instruction corresponding to the first notification entry, it controls the first notification entry to switch to the locked state. That is, when the mobile terminal receives the clear instruction corresponding to the notification bar interface, the first notification entry is retained and other notification entries are cleared.

In some embodiments, when it is detected that the first application exits from running, the notification entries related to the first application are cleared in the notification bar interface. That is, when the first application exits from running, the notification entries (for example, the first notification entry and the second notification entry described above) related to the first application in the notification bar interface are automatically cleared.

In the embodiments of the present disclosure, the notification entry related to the first application can be switched to the locked state automatically or manually, which is convenient for the user to retain the notification entry of interest according to personal information, and then delete other notification entries, to make the notification bar interface easier and provide convenience for users to browse.

The following are device embodiments corresponding to the method embodiments. For details of the device embodiments, reference may be made to the method embodiments.

Figure 10:
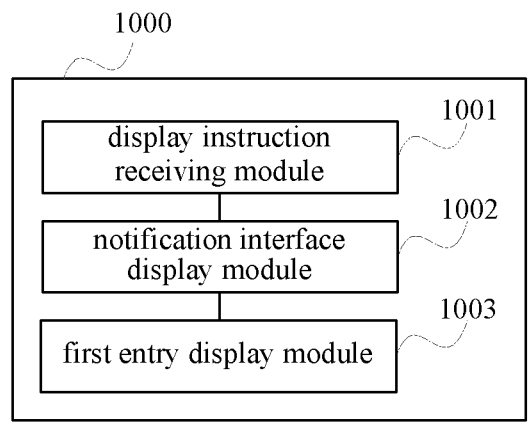
FIG. 10 is a block diagram showing a device for displaying content in a notification bar according to an exemplary embodiment.

FIG. 10 is a block diagram showing a device 1000 for displaying content in a notification bar according to an exemplary embodiment. The device 1000 has a function of implementing the method for displaying the content in the notification bar at the mobile terminal side. The function may be implemented by hardware, or software, a combination of hardware and software. The device 1000 may be a mobile terminal, or a part of the mobile terminal. The device 1000 may include: a display instruction receiving module 1001, a notification interface display module 1002, and a first entry display module 1003.

The display instruction receiving module 1001 is configured to receive a display instruction corresponding to a notification bar interface.

The notification interface display module 1002 is configured to display the notification bar interface according to the display instruction.

The first entry display module 1003 is configured to display a first notification entry in the notification bar interface, the first notification entry including related information of recently browsed media content in a first application, and the related information including identification information and/or browsing progress. The first notification entry may further include a first operation control.

Figure 11:
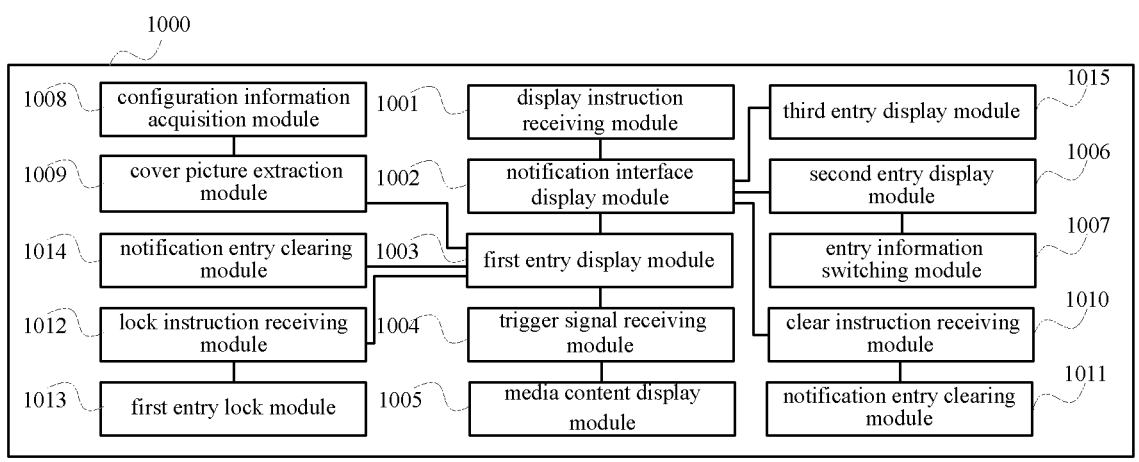
FIG. 11 is a block diagram showing a device for displaying content in a notification bar according to an exemplary embodiment.

FIG. 11 is a block diagram showing the device 1000 for displaying content in a notification bar according to an exemplary embodiment. The device 1000 further includes: a trigger signal receiving module 1004 and a media content display module 1005.

The trigger signal receiving module 1004 is configured to receive a trigger signal corresponding to the first operation control.

The media content display module 1005 is configured to invoke the first application to display a detailed interface of the recently browsed media content according to the trigger signal.

In an exemplary embodiment, as shown in FIG. 11, the device 1000 further includes: a second entry display module 1006.

The second entry display module 1006 is configured to display a second notification entry in the notification bar interface, the second notification entry including related information of updated media content in the first application.

In an exemplary embodiment, as shown in FIG. 11, the device 1000 further includes: an entry information switching module 1007.

The entry information switching module 1007 is configured to switch related information of first media content displayed in the second notification entry to related information of second media content to be displayed in the second notification entry according to an information switching instruction corresponding to the second notification entry, when the updated media content includes at least two pieces of updated media content.

In an exemplary embodiment, as shown in FIG. 11, the device 1000 further includes: a configuration information acquisition module 1008 and a cover picture extraction module 1009.

The configuration information acquisition module 1008 is configured to acquire configuration information of a user interface of the first application, the configuration information including content to be displayed in the user interface of the first application.

The cover picture extraction module 1009 is configured to extract the cover picture of the recently browsed media content from the configuration information.

In an exemplary embodiment, as shown in FIG. 11, the device 1000 further includes: a clear instruction receiving module 1010 and a notification entry clearing module 1011.

The clear instruction receiving module 1010 is configured to receive a clear instruction corresponding to the notification bar interface.

The notification entry clearing module 1011 is configured to clear notification entries in an unlocked state in the notification bar interface and retain notification entries in a locked state according to the clear instruction, wherein the first notification entry is in the locked state.

In an exemplary embodiment, as shown in FIG. 11, the device 1000 further includes: a lock instruction receiving module 1012 and a first entry lock module 1013.

The lock instruction receiving module 1012 is configured to receive a lock instruction corresponding to the first notification entry.

The first entry lock module 1013 is configured to control the first notification entry to switch from the unlocked state to the locked state according to the lock instruction.

In an exemplary embodiment, as shown in FIG. 11, the device 1000 further includes a notification entry clearing module 1014.

The notification entry clearing module 1014 is configured to clear notification entries related to the first application in the notification bar interface, when it is detected that the first application exits from running.

In an exemplary embodiment, as shown in FIG. 11, the device 1000 further includes a third entry display module 1015.

The third entry display module 1015 is configured to display a third notification entry in the notification bar interface, the third notification entry including recommendation information associated with recently browsed media content in a second application.

In the embodiments of the present disclosure, by displaying the first notification entry in the notification bar interface, the first notification entry including the related information of the recently browsed media content in the first application, such as the identification information and/or the browsing progress, which achieves that the related information of the media content is displayed to the user in the notification bar interface, so that the user can quickly learn about the browsing progress of the recently browsed media content, and the amount of information and display content in the notification bar interface is enriched, thereby providing the user with richer, more useful information in the notification bar interface.

An exemplary embodiment of the present disclosure also provides a device for displaying content in a notification bar, which can implement the method for displaying the content in the notification bar provided by the present disclosure. The device includes: a processor and a memory for storing executable instructions of the processor. The processor is configured to: receive a display instruction corresponding to a notification bar interface; display the notification bar interface according to the display instruction; display a first notification entry in the notification bar interface, the first notification entry including related information of recently browsed media content in a first application, and the related information including identification information and/or browsing progress.

In some embodiments, the first notification entry further includes a first operation control, and the processor is further configured to: replace key information in a card entry with preset content, according to a key information hiding instruction.

In some embodiments, the processor is further configured to: receive a trigger signal corresponding to the first operation control; invoke the first application to display a detailed interface of the recently browsed media content according to the trigger signal.

In some embodiments, the processor is further configured to: display a second notification entry in the notification bar interface, the second notification entry including related information of updated media content in the first application.

In some embodiments, the processor is further configured to: switch related information of first media content displayed in the second notification entry to related information of second media content to be displayed in the second notification entry according to an information switching instruction corresponding to the second notification entry, when the updated media content includes at least two pieces of updated media content.

The first media content and the second media content are two pieces of different updated media content.

In some embodiments, the processor is further configured to: acquire configuration information of a user interface of the first application, the configuration information including content to be displayed in the user interface of the first application; extract the cover picture of the recently browsed media content from the configuration information.

In some embodiments, the processor is further configured to: receive a clear instruction corresponding to the notification bar interface; and clear notification entries in an unlocked state in the notification bar interface and retain notification entries in a locked state according to the clear instruction. The first notification entry is in the locked state.

In some embodiments, the processor is further configured to: receive a lock instruction corresponding to the first notification entry; and control the first notification entry to switch from the unlocked state to the locked state according to the lock instruction.

In some embodiments, the processor is further configured to: clear notification entries related to the first application in the notification bar interface, when it is detected that the first application exits from running.

In some embodiments, the processor is further configured to: display a third notification entry in the notification bar interface, the third notification entry including recommendation information associated with recently browsed media content in a second application.

Figure 12:
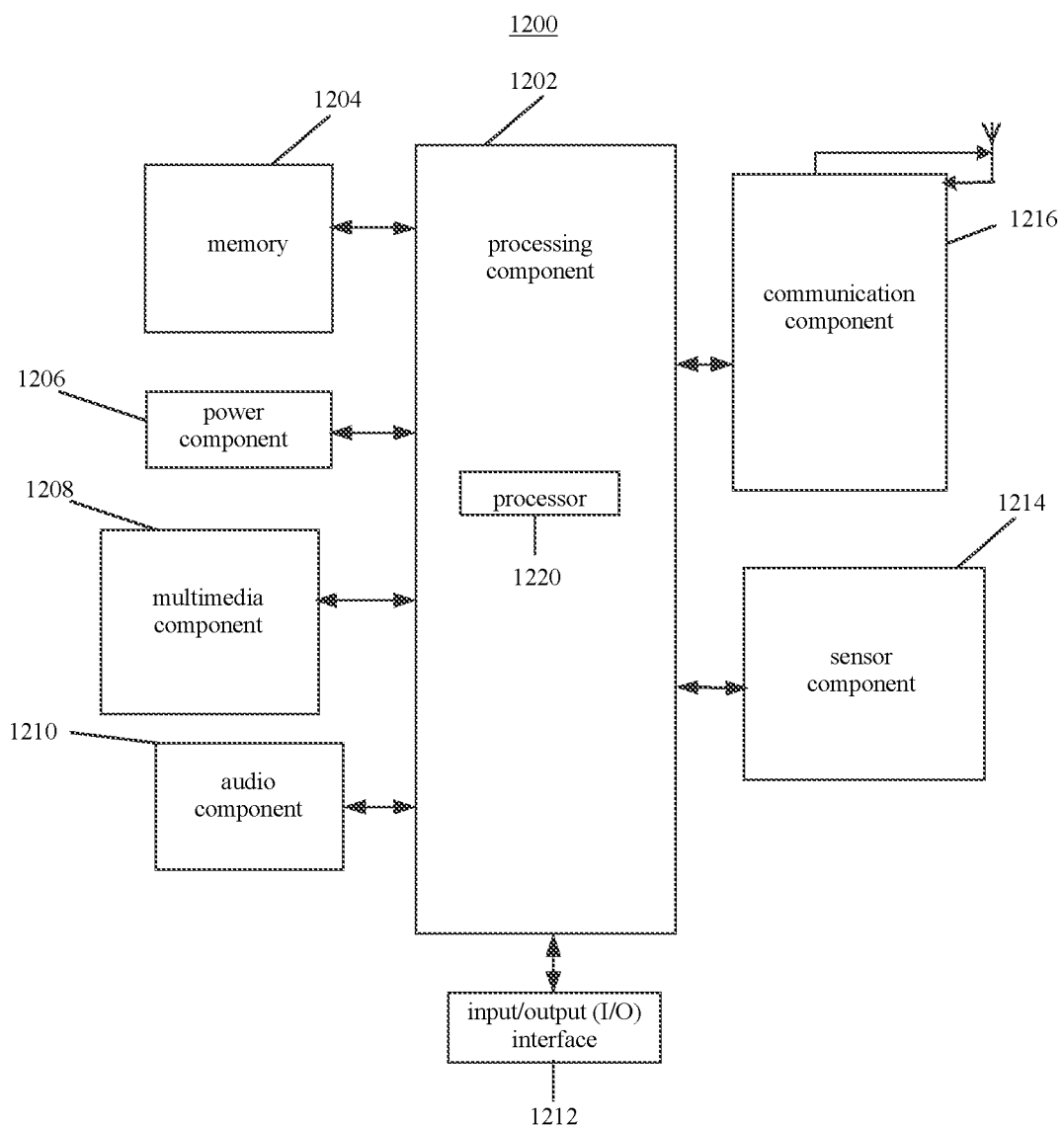
FIG. 12 is a block diagram showing a device according to an exemplary embodiment.

FIG. 12 is a block diagram showing a device 1200 according to an exemplary embodiment. For example, the device 1200 may be a portable electronic device such as a mobile phone, a tablet computer, a game console, an e-book reader, a multimedia player, or a wearable device.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls the overall operations of the device 1200, such as the operations associated with display, telephone calls, data communications, camera operations, and recording operations. The processing component 1202 can include one or more processors 1220 to execute instructions to perform all or part of the steps in the above described methods. Moreover, the processing component 1202 can include one or more modules to facilitate the interaction between the processing component 1202 and other components. For example, the processing component 1202 can include a multimedia module to facilitate the interaction between the multimedia component 1208 and the processing component 1202.

The memory 1204 is configured to store various types of data to support the operation of the device 1200. Examples of such data include instructions for any application or method operated on the device 1200, such as the contact data, the phone book data, messages, pictures, videos, and the like. The memory 1204 can be implemented by any type of volatile or non-volatile storage device, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 can include a power management system, one or more power sources, and other components associated with the generation, management, and distribution of power in the device 1200.

The multimedia component 1208 includes a screen providing an output interface between the device 1200 and the user t. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. When the device 1200 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1210 is configured to output and/or input an audio signal. For example, the audio component 1210 includes a microphone (MIC) configured to receive an external audio signal when the device 1200 is in an operation mode, such as a call mode, a recording mode, and a voice recognition mode. The received audio signal may be further stored in the memory 1204 or sent via the communication component 1216. In some embodiments, the audio component 1210 also includes a speaker for outputting the audio signal.

The I/O interface 1212 provides an interface between the processing component 1202 and peripheral interface modules, such as a keyboard, a click wheel, buttons, and the like. These buttons may include, but are not limited to, a home button, a volume button, a starting button, and a locking button.

The sensor component 1214 includes one or more sensors for providing status assessments of various aspects of the device 1200. For example, the sensor component 1214 can detect an open/closed status of the device 1200, relative positioning of components, such as the display and the keypad of the device 1200. The sensor component 1214 can also detect a change in position of one component of the device 1200 or the device 1200, the presence or absence of user contact with the device 1200, an orientation, or an acceleration/deceleration of the device 1200, and a change in temperature of the device 1200. The sensor component 1214 can include a proximity sensor configured to detect the presence of nearby objects without any physical contact. The sensor component 1214 can also include a light sensor, such as a CMOS or CCD image sensor, configured to use in imaging applications. In some embodiments, the sensor component 1214 can also include an accelerometer sensor, a gyroscope sensor, a magnetic sensor, a pressure sensor, or a temperature sensor.

The communication component 1216 is configured to facilitate wired or wireless communication between the device 1200 and other devices. The device 1200 can access a wireless network based on a communication standard, such as Wi-Fi, 4G or 5G, or a combination thereof. In an exemplary embodiment, the communication component 1216 receives broadcast signals or broadcast associated information from an external broadcast management system via a broadcast channel. In an exemplary embodiment, the communication component 1216 also includes a near field communication (NFC) module to facilitate short-range communications.

In an exemplary embodiment, the device 1200 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, to perform the method for displaying content in the notification bar.

In an exemplary embodiment, there is also provided a non-transitory computer-readable storage medium including instructions, such as a memory 1204 including instructions executable by the processor 1220 of the terminal 1200 to perform the above described method. For example, the non-transitory computer readable storage medium may be a ROM, a random access memory (RAM), a CD-ROM, a magnetic tape, a floppy disc, and an optical data storage device.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative only, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for displaying content in a notification bar, comprising:
    receiving a display instruction corresponding to a notification bar interface;
    displaying the notification bar interface according to the display instruction;
    displaying a first notification entry in the notification bar interface, the first notification entry comprising related information of media content recently browsed in a first application and a first operation control, and the related information comprising at least one of identification information or a browsing progress;
    receiving a trigger signal corresponding to the first operation control; and
    invoking the first application to display a detailed interface of the recently browsed media content, according to the trigger signal.

2. The method according to claim 1, further comprising:
    displaying a second notification entry in the notification bar interface, the second notification entry comprising related information of updated media content in the first application.

3. The method according to claim 2, further comprising:
    switching related information of first media content displayed in the second notification entry to related information of second media content to be displayed in the second notification entry according to an information switching instruction corresponding to the second notification entry, when the updated media content comprises at least two pieces of updated media content,
    wherein the first media content and the second media content are two pieces of different updated media content.

4. The method according to claim 1, wherein the identification information comprises a cover picture of the recently browsed media content, and the method further comprises:
    acquiring configuration information of a user interface of the first application, the configuration information comprising content to be displayed in the user interface of the first application; and
    extracting the cover picture of the recently browsed media content from the configuration information.

5. The method according to claim 1, further comprising:
    receiving a clear instruction corresponding to the notification bar interface; and clearing one or more notification entries in an unlocked state in the notification bar interface and retaining one or more notification entries in a locked state according to the clear instruction,
wherein the first notification entry is in the locked state.

6. The method according to claim 5, further comprising:
receiving a lock instruction corresponding to the first notification entry; and
controlling the first notification entry to switch from the unlocked state to the locked state according to the lock instruction.

7. The method according to claim 1, further comprising:
clearing one or more notification entries related to the first application in the notification bar interface, when it is detected that the first application exits from running.

8. The method according to claim 1, further comprising:
displaying a third notification entry in the notification bar interface, the third notification entry comprising recommendation information associated with media content recently browsed in a second application.

9. A device for displaying content in a notification bar, comprising:
a processor; and
a memory for storing instructions executable by the processor,
wherein the processor is configured to:
receive a display instruction corresponding to a notification bar interface;
display the notification bar interface according to the display instruction;
display a first notification entry in the notification bar interface, the first notification entry comprising related information of media content recently browsed in a first application and a first operation control, and the related information comprising at least one of identification information or a browsing progress;
receive a trigger signal corresponding to the first operation control; and
invoke the first application to display a detailed interface of the recently browsed media content, according to the trigger signal.

10. The device according to claim 9, wherein the processor is further configured to:
display a second notification entry in the notification bar interface, the second notification entry comprising related information of updated media content in the first application.

11. The device according to claim 10, wherein the processor is further configured to:
switch related information of first media content displayed in the second notification entry to related information of second media content to be displayed in the second notification entry according to an information switching instruction corresponding to the second notification entry, when the updated media content comprises at least two pieces of updated media content,
wherein the first media content and the second media content are two pieces of different updated media content.

12. The device according to claim 9, wherein the identification information comprises a cover picture of the recently browsed media content, and the processor is further configured to:
acquire configuration information of a user interface of the first application, the configuration information comprising content to be displayed in the user interface of the first application; and
extract the cover picture of the recently browsed media content from the configuration information.

13. The device according to claim 9, wherein the processor is further configured to:
receive a clear instruction corresponding to the notification bar interface; and
clear one or more notification entries in an unlocked state in the notification bar interface and retain one or more notification entries in a locked state according to the clear instruction, wherein the first notification entry is in the locked state.

14. The device according to claim 13, wherein the processor is further configured to:
receive a lock instruction corresponding to the first notification entry; and
control the first notification entry to switch from the unlocked state to the locked state according to the lock instruction.

15. The device according to claim 9, wherein the processor is further configured to:
clear one or more notification entries related to the first application in the notification bar interface, when it is detected that the first application exits from running.

16. The device according to claim 9, wherein the processor is further configured to:
display a third notification entry in the notification bar interface, the third notification entry comprising recommendation information associated with media content recently browsed in a second application.

17. A non-transitory computer-readable storage medium having stored thereon instructions that, when executed by a processor of a mobile terminal, cause the mobile terminal to perform a method for displaying content in a notification bar, the method comprising:
receiving a display instruction corresponding to a notification bar interface;
displaying the notification bar interface according to the display instruction;
displaying a first notification entry in the notification bar interface, the first notification entry comprising related information of media content recently browsed in a first application and a first operation control, and the related information comprising at least one of identification information or a browsing progress;
receiving a trigger signal corresponding to the first operation control; and
invoking the first application to display a detailed interface of the recently browsed media content, according to the trigger signal.

* * * * *